United States Patent [19]

Chapman et al.

[11] Patent Number: 5,259,120

[45] Date of Patent: Nov. 9, 1993

[54] CALIBRATION AND MEASUREMENT DEVICE

[75] Inventors: Mark A. V. Chapman, Wotton-Under-Edge; Seamus McFadden, Bristol; Marcus J. Eales, Wotton-Under-Edge; Andrew M. Bailey, Bristol, all of United Kingdom

[73] Assignee: Renishaw Transducer Systems Limited, Gloucestershire, United Kingdom

[21] Appl. No.: 915,308

[22] Filed: Jul. 20, 1992

[30] Foreign Application Priority Data

Jul. 27, 1991 [GB] United Kingdom ............... 9116244
Dec. 19, 1991 [GB] United Kingdom ............... 9126916
Feb. 8, 1992 [GB] United Kingdom ............... 9202677

[51] Int. Cl.⁵ .................................. G01B 5/03
[52] U.S. Cl. .................................. 33/502; 33/503
[58] Field of Search ............. 33/502, 503, 567, 567.1, 33/832, 556, 558; 73/1 R, 1 J

[56] References Cited

U.S. PATENT DOCUMENTS

| | | |
|---|---|---|
| 4,435,905 | 3/1984 | Bryan . |
| 4,492,036 | 1/1985 | Beckwith, Jr. . |
| 4,884,348 | 12/1989 | Zeller et al. ........................ 33/502 |
| 4,936,024 | 6/1990 | Greenslade ........................ 33/556 |
| 4,982,504 | 1/1991 | Söderberg et al. ................ 33/502 |
| 5,052,115 | 10/1991 | Burdekin ........................... 33/502 |
| 5,111,590 | 5/1992 | Park ................................... 33/502 |

FOREIGN PATENT DOCUMENTS

| | | |
|---|---|---|
| 0194386 | 9/1986 | European Pat. Off. . |
| 3504464C1 | 4/1986 | Fed. Rep. of Germany . |
| 0209857 | 9/1986 | Japan ................................. 33/502 |
| WO8911631 | 11/1989 | PCT Int'l Appl. . |
| 1352172 | 11/1987 | U.S.S.R. ........................... 33/502 |
| 2210978 | 6/1989 | United Kingdom . |
| 2211296A | 6/1989 | United Kingdom . |

Primary Examiner—William A. Cuchlinski, Jr.
Assistant Examiner—Alvin Wirthlin
Attorney, Agent, or Firm—Oliff & Berridge

[57] ABSTRACT

A ball-bar 26 for calibrating machine tools and coordinate measuring machines comprise a unit 30 containing a displacement transducer 34 for measuring axial displacement of a precision ball 28. The ball 28 is pivotably located on the head or spindle 12 of the machine, which is driven in a circle about a ball 22 mounted on the bed or table 10 of the machine at the other end of the ball-bar in order to perform a calibration. The ball-bar has a modular construction, its various components such as the unit 30, extension bar 40, magnetic sockets 24,29, supporting device 14 and magnetic clamp 16 being connected together via M6 screw-threads, e.g. at 18,42,44. This enables the unit 30 to be connected to the various other components in a variety of configurations, e.g. for use as an electronic dial gauge.

12 Claims, 4 Drawing Sheets

CALIBRATION AND MEASUREMENT DEVICE

FIELD OF THE INVENTION

This invention relates to calibration and measurement devices. It is particularly useful for performing calibrations and other measurements on coordinate positioning machines such as machine tools and coordinate measuring machines.

DESCRIPTION OF PRIOR ART

Such machines typically comprise a head movable in three dimensions relative to a table on which, for example, a workpiece is supported. Scales and readheads or other position transducers are provided for measuring the coordinate position of the head relative to the table. For calibrating such machines, it is known to provide a device called a ball-bar, such as described in U.S. Pat. No. 4,435,905 (Bryan). The device comprises an elongate telescopic bar provided with a ball at each end. In use, each of the balls is retained in a socket provided on the head and table respectively of the machine. The head of the machine is then driven in a circular path about the centre of the ball retained in the socket on the table. A single axis linear displacement transducer provided on the telescopic bar determines the extent to which the path of the head varies from the desired circular path. If a longer ball-bar is required, an extension bar can be screwed into place in the middle of the ball-bar described. Another such device is described in our co-pending U.S. patent application No. 07/864,338.

Another distinct type of known measurement device is the dial gauge or clock gauge. The original mechanical dial gauges comprise an axially displaceable stylus or plunger. The stylus or plunger has a free end for engaging a surface, the location of which is to be measured. The amount by which the stylus or plunger is displaced by engagement with the surface is indicated, in these original mechanical devices, by a rotary needle on a dial. Nowadays, however, the displacement of the stylus or plunger is frequently measured by a single axis linear displacement transducer, and an electronic readout is provided instead of the dial. The term "electronic dial gauge" is nevertheless still used. Dial gauges are frequently used for setting-up purposes on multiple-axis machines such as machine tools, coordinate measuring machines and robots and on two-axis machines such as layout machines. For example, they are used to set the alignment of a workpiece or other object parallel or perpendicular to one of the axes of movement of the machine.

SUMMARY OF THE INVENTION

Preferred embodiments of the present invention provide a modular measuring system, components of which can be connected together to form various distinct types of calibration or measurement devices, such as a ball-bar or an electronic dial gauge.

One aspect of the invention provides a calibration device for calibrating a coordinate positioning machine, comprising an elongate bar, a first reference element (such as a ball) at one end of the bar, a second reference element (which may be a ball or a socket for receiving a ball) at a location on the bar spaced from the first reference element, telescopic means for permitting the first reference element to move in an axial direction of the bar, relative to the second reference element, and a transducer for measuring such movement, characterised by the provision of a rigid support member which can be releasably connected to the bar for securing the bar rigidly to the machine. In the preferred embodiments, when the first reference element, the telescopic means and the transducer are connected to the rigid support member, they can be used, for example, as an electronic dial gauge. By using the second reference element, the device forms a calibration device usable in a similar manner to a ball-bar. Preferably the second reference element is releasably connected to the bar, and in some embodiments the rigid support member can be releasably connected to the bar in place of the second reference element.

A second aspect of the present invention provides a calibration device for calibrating a coordinate positioning machine having two machine parts which are movable in two or three dimensions relative to each other, the device comprising an elongate bar having a first connector at one end thereof for universal pivotable connection of said one end to one of said machine parts, said first connector being axially movable relative to an opposing end of the bar, a transducer being provided in the bar for measuring said axial movement, and a second connector being provided for universal pivotable connection between the bar and the other one of said machine parts, characterised in that said second connector is provided at an intermediate position between the ends of the bar. Preferably the second connector is provided on an element which can be fixed at any of a plurality of such intermediate positions.

DESCRIPTION OF PREFERRED EMBODIMENTS

Figure 1:
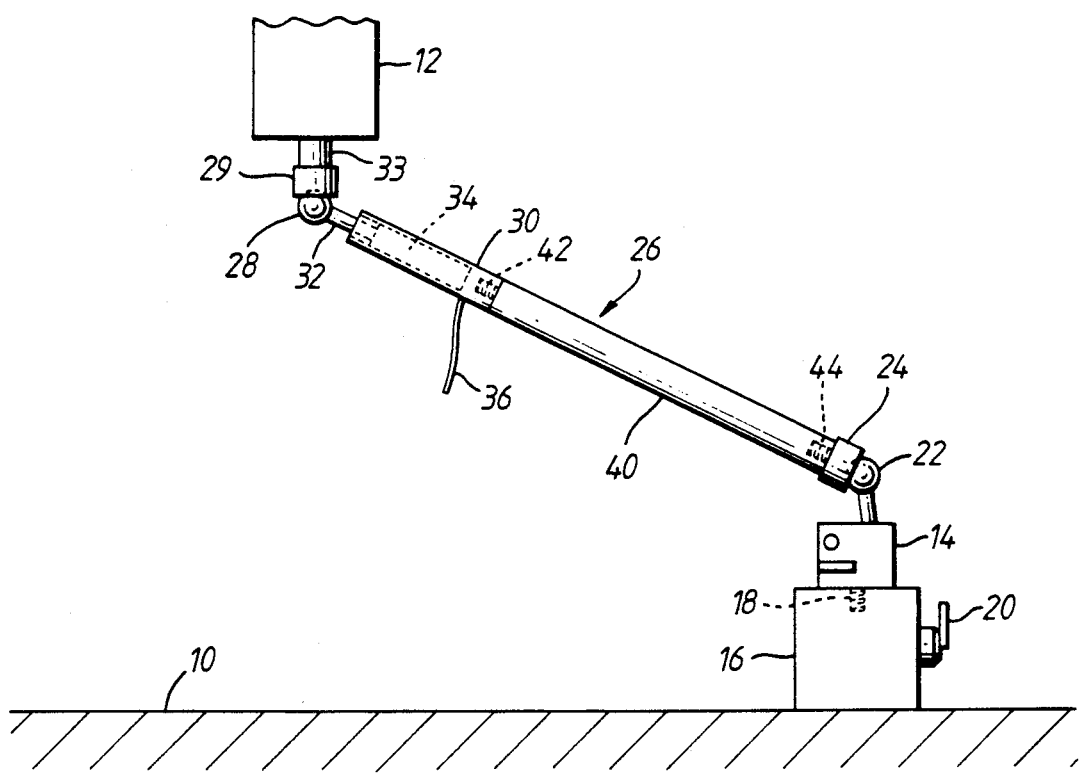
FIG. 1 shows a ball-bar in use on a machine tool.

Referring firstly to FIG. 1, the ball-bar is mounted on a machine tool having a workpiece-holding table or bed 10, and a spindle or head 12 normally used for holding cutting tools. The head 12 is movable in three coordinate directions X,Y,Z relative to the table 10, and has scales and readheads or other transducers (not shown) for measuring the coordinate position. It should be understood that the present description of a machine tool is purely an example, and the invention may also be used on other coordinate positioning machines such as coordinate measurement machines, robots, and machines having a head movable in only two axes such as layout machines.

An adjustable supporting device 14 is clamped to the table 10 by a magnetically operating workholder 16. The magnetic workholder 16 is available under the trade mark Eclipse, and has an M6 screw-threaded hole 18 for receiving a screw projecting from the underside of the supporting device 14. The magnetic workholder 16 is clamped and unclamped to and from the table 10 by operation of a lever 20. However, it is possible to use a workholder which is held to the table by a simple, fixed permanent magnet, or by finger clamps.

The supporting device 14 is described in more detail in our co-pending patent application referred to above, and adjustably supports a reference ball 22. A ball-bar 26, described in more detail below, has a magnetic cup or socket 24 at one end, which receives the ball 22 kinematically in a universally pivotal manner, such that the ball-bar 16 pivots accurately about the centre of the ball 22. At the other end of the ball-bar 26 is a reference ball 28. This is similarly received kinematically in a universally pivotal manner in a magnetic socket 29, which is secured via an integral spigot 33 and a collet (not shown) to the movable head 12 of the machine. The ball 28 and the magnetic socket 24 form first and second reference elements at the two ends of the ball-bar. The magnetic sockets 24,29 may be as described in our co-pending patent application referred to above, or in Precision Engineering, April 1982, Vol. 4, No. 2, pages 61–69.

The ball-bar 26 is of a modular construction, the chief component of which is a transducer unit 30. The first reference ball 28 projects from the transducer unit 30 on a guide rod 32 which is telescopically slidable in the axial direction of the ball-bar. Within the unit 30 is a single axis linear displacement transducer 34, which produces an output on a cable 36 indicating the axial displacement of the ball 28 relative to the ball 22 in the socket 24. The transducer includes a bias spring to bias the ball 28 outwards.

In the arrangement as shown, the transducer unit 30 is connected to the magnetic socket 24 via an extension bar 40. For this purpose, the end of the transducer unit 30 opposite the ball 28 has an M6 threaded bore 42 which receives an M6 threaded boss on one end of the extension bar 40. The other end of the extension bar 40 has a similar M6 threaded bore 44 receiving an M6 threaded boss on the socket 24. Ball-bars 26 of various lengths can be produced by exchanging the extension bar 40 for one of a different length, or a shorter bar can be obtained simply by screwing the bore 42 of the transducer unit 30 directly to the boss of the socket 24, with no intervening extension bar.

To calibrate the machine, the head 12 is driven in a circular path around the centre of the ball 22. The transducer 34 monitors any deviations from a truly circular path. The method of use is generally similar to that described in our co-pending application referred to above, or in U.S. Pat. No. 4,435,905.

Figure 2:
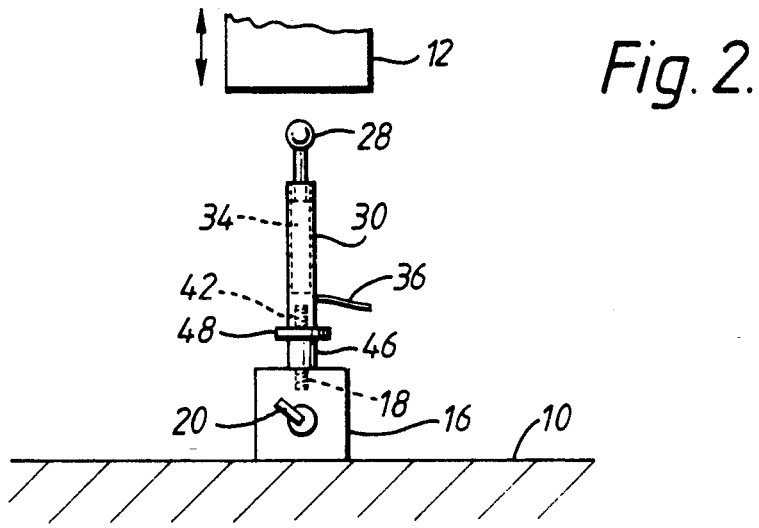
FIG. 2 shows a part of the ball-bar in use as a dial gauge in a first configuration.

FIG. 2 shows one way in which the transducer unit 30 can be used as an electronic dial gauge instead of use as a ball-bar. In this example, the repeatability of the positioning of the head 12 in the vertical (Z) direction is checked. For this purpose, the transducer unit 30 with its ball 28 is fixed vertically in the magnetic workholder 16, using the M6 threaded bores 18,42 of the workholder and the transducer unit. The connection is made via a male to female adaptor 46 having an M6 threaded boss at each end. The adaptor 46 also has a lock nut 48 to permit the transducer unit 30 to be secured in any desired angular orientation about its axis, though this is not essential. The adaptor 46 and workholder 16 thus form a rigid support member by which the unit 30 is rigidly secured to the table 10.

The FIG. 2 configuration is used as follows. The head 12 is brought vertically down into engagement with the ball 28, by commanding the control of the machine to move to a specified point as indicated by the scales and readheads on the machine's axes of movement. The output from the displacement transducer 34 is noted. The head 12 is then commanded to lift away from the ball 28, and to perform an exercise elsewhere in the working volume of the machine. It is then brought vertically back into engagement with the ball 28, to the same commanded position as previously. The output of the transducer 34 is again read. Any difference between the two readings of the transducer 34 indicates a lack of repeatability in the vertical positioning of the head 12. The process is repeated a number of times, and a statistical analysis is performed on the readings from the transducer 34 to obtain, for example, a $2\sigma$ value for the repeatability. If desired, the configuration of FIG. 2 could also be used for the vertical setting of a cutting tool mounted in the head 12. It is then performing a similar function to a conventional tool setting probe.

Figure 3:
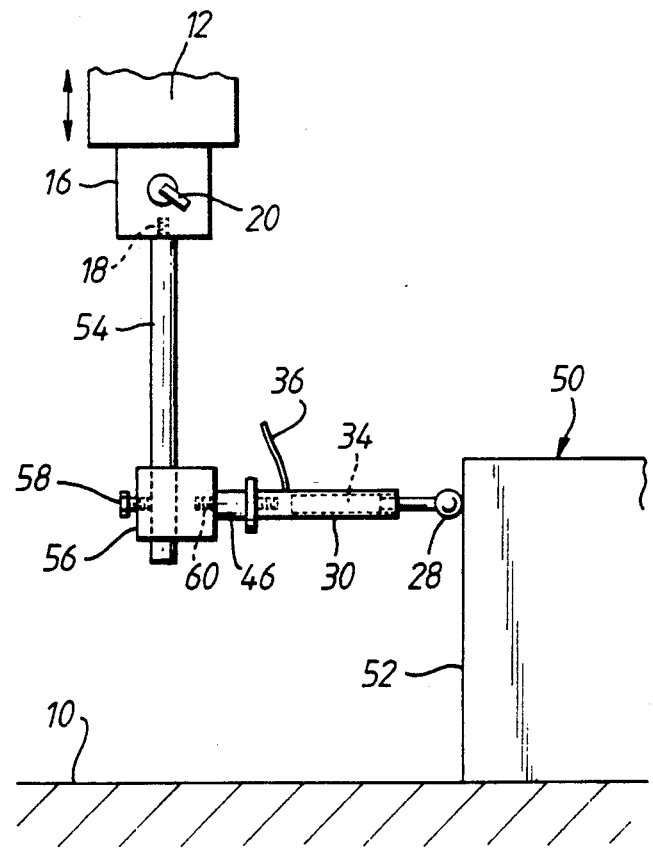
FIG. 3 shows a part of the ball-bar in use as a dial gauge in a second configuration.

FIG. 3 shows another method of using the transducer unit 30 as an electronic dial gauge. Here, it is being used to check that the vertical (Z) axis of movement of the head 12 is correctly aligned perpendicular to the table 10. For this purpose, a gauge block 50 is clamped to the table 10 so that a datum surface 52 of the block is accurately perpendicular to the table 10. The transducer unit 30 is secured to the head 12 in a horizontal position, as follows. The magnetic holder 16 is magnetically clamped to the head 12, and receives a downwardly extending extension bar 54 in its M6 threaded bore 18. A clamp block 56 is clamped onto the bar 54 by means of a screw 58. The block 56 has an M6 threaded bore 60, which receives the transducer unit 30 in its horizontal position via the male to female adaptor 46. The adaptor 46, clamp block 56, extension bar 54 and holder 16 thus form a rigid support member by which the unit 30 is rigidly secured to the head 12.

The configuration of FIG. 3 is used as follows. The head 12 is moved so as to bring the ball 28 into contact with the datum surface 52 of the gauge block 50, as shown. The reading from the transducer 34 is noted. The head 12 is then commanded to move slowly in the vertical direction, so that the ball 28 slides vertically along the datum surface 52. Any deviations in the output of the transducer 34 indicate misalignments or straightness errors of the Z-axis motion of the head 12.

For use as a ball-bar, the reference ball 28 is preferably a precision sphere, and the precision could deteriorate by repeated use in the manner shown in FIGS. 2 and 3. To overcome this, the ball 28 can desirably be unscrewed from the end of the guide rod 32. It can then be replaced by screwing on a ball of lower precision, or an end element of any other shape. Alternatively, instead of the ball 28, the guide rod 32 may carry a magnetic socket similar to the socket 24. For ball-bar use, this magnetic socket pivotally receives a precision ball mounted in place of the socket 29 on the head 12. For dial gauge use, it receives a lower precision ball or another end element. A further alternative is simply to fit a protective cap over the ball 28.

Many other configurations of the transducer unit 30 for use as an electronic dial gauge will be readily apparent. For example, the transducer unit 30 can be mounted so as to extend vertically downwards from the head 12, via the magnetic holder 16 and the male to female adaptor 46. The head can then be moved vertically downwards to bring the ball 28 into contact with the table 10, either to check vertical repeatability by a process similar to that described above for FIG. 2, or in order to traverse horizontally along the table 10 to indicate its horizontal alignment directly. Alternatively, either this vertical configuration or the horizontal configuration of FIG. 3 can be used as a single axis analogue probe for measuring the dimensions of features of a workpiece. In another configuration, the workholder 16 is magnetically clamped to the table 10 as in FIG. 2, and the transducer unit 30 is mounted in a horizontal attitude to the holder 16, via an extension 54, clamping block 56 and adaptor 46. Such an arrangement is useful for checking the repeatability of the head 12 or the setting of a cutting tool in a horizontal direction, in a manner analogous to that described above for FIG. 2 except that the head 12 is brought into engagement with the ball 28 in the horizontal direction instead of the vertical direction. Alternatively, this or similar configurations can be used for adjusting the alignment of an object which is being secured to the table 10, or for centering a workpiece mounted on a rotary table provided on the table 10, or for centering a workpiece in a chuck of a lathe.

The use of the transducer unit 30 as an electronic dial gauge or single axis probe can be made very flexible by the provision of an appropriate kit of connecting elements such as the extension bar 54, clamping block 56 and adaptor 46. By connecting several such elements together, the transducer unit 30 can be secured in any desired position and orientation. Desirably, therefore, the equipment described is supplied as a kit which contains all the parts necessary to make the ball-bar shown in FIG. 1, including extension bars 40 of various lengths to make ball-bars of different lengths; and which also includes a selection of extension bars 54, clamping blocks 56 and a male to female adaptor 46. The connecting elements 54,56,46 are in fact already available commercially from the present applicants Renishaw Transducer Systems Limited, sold as a kit for mounting optical components of an interferometer system.

It will be understood that the flexibility of use of the transducer unit 30 is achieved by the use of M6 threaded connections on the various components, so that they can be connected together in numerous different ways. Naturally, the invention is not limited to the use of M6 connections, and other sizes of screw thread or any other type of interchangeable connection may be used.

Figure 4:
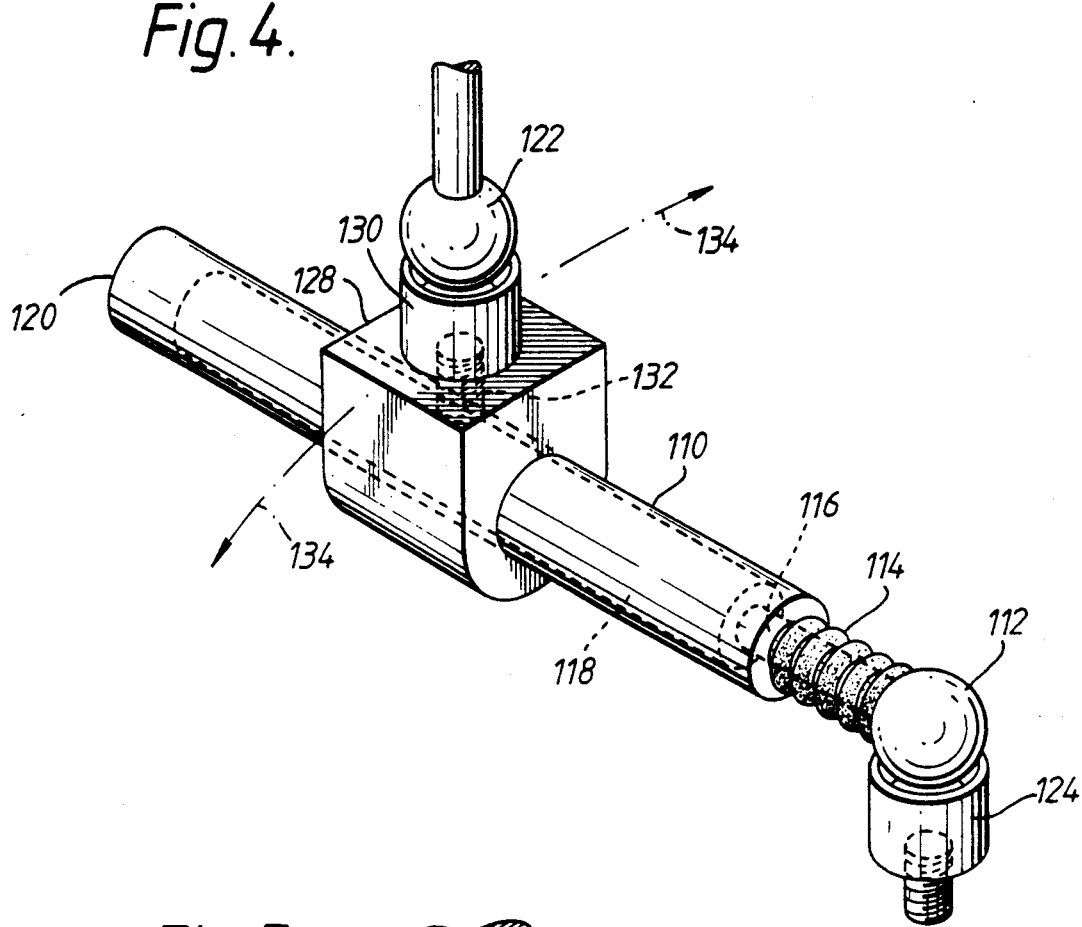
FIG. 4 is a perspective view of a further ball-bar configuration.

FIG. 4 shows a ball-bar which uses components similar to some of those described above. The major part of the bar comprises an elongate transducer unit 110 from one end of which a reference ball 112 projects telescopically on an axially slidable rod 116 within a flexible gaiter 114. Within the unit 110 there is a single axis linear displacement transducer 118, which measures the sliding displacement of the rod 116 and hence the position of the reference ball 112, and which includes a bias spring to bias the ball 112 outwards. In use, the ball-bar is universally pivotably mounted between a reference ball 122 fixed in the head or spindle of a machine tool, and a precision magnetic socket 124, which is clamped to the bed or table of the machine tool via an adjustable supporting device in the same manner as the ball 22 in FIG. 1.

At the other end 120 of the unit 110, there may be provided a similar magnetic socket for receiving a second reference ball, or a screwed connection may be provided for receiving such a socket as shown at 42 in FIG. 1. This enables the device to be used as a ball-bar in the same way as shown in FIG. 1. However, in the present configuration no use is made of any such socket at the end 120.

Instead of coupling the reference ball 122 to a socket at the end 120, a collar 128 is axially slidably mounted on the outside of the unit 110. A precision magnetic socket 130, similar to the magnetic socket 124, has a projecting M6 screw-threaded boss received in an M6 threaded bore 132 in the collar 128. The ball 122 is received in the socket 130. The collar 128 can be fastened in any desired position along the length of the ball-bar unit 110, and a simple way of achieving this is to use the threaded boss of the socket 130 to act as a grub screw. If desired, to prevent damage to the ball-bar unit 110, an intermediate element of a softer material may be trapped within the collar 128 between the end of the threaded boss and the unit 110.

In use, the collar 128 is fixed at a desired position along the length of the ball-bar unit 110, corresponding to a desired radius. The reference ball 112 is fitted in the socket 124, and the reference ball 122 in the socket 130. The machine spindle is then commanded to follow a circular path about a vertical line passing through the centre of the reference ball 112, as suggested by arrows 134. The transducer 118 provides output signals, any variations in which indicate that the machine has departed from a true circular path. The advantage of this embodiment over that of FIG. 1 is that it is possible to perform a calibration over a circular path having a chosen radius which is smaller than the length of the unit 110.

It will be appreciated that the same effect can be achieved with other configurations of the balls 112,122 and sockets 124,130. For example, the socket 130 may be mounted in the machine tool spindle, with the ball 122 being fixed on the collar 128 by an M6 screw connection. This configuration has the advantage that the various components may be taken from the same standardised kit of components referred to above. Alternatively, the configuration of FIG. 4 may be inverted, with the ball 112 being received in a socket mounted in the machine tool spindle, and the collar 128 being pivotably mounted on the machine tool bed or table via a ball/socket combination and the supporting device 14 of FIG. 1.

Figure 5:
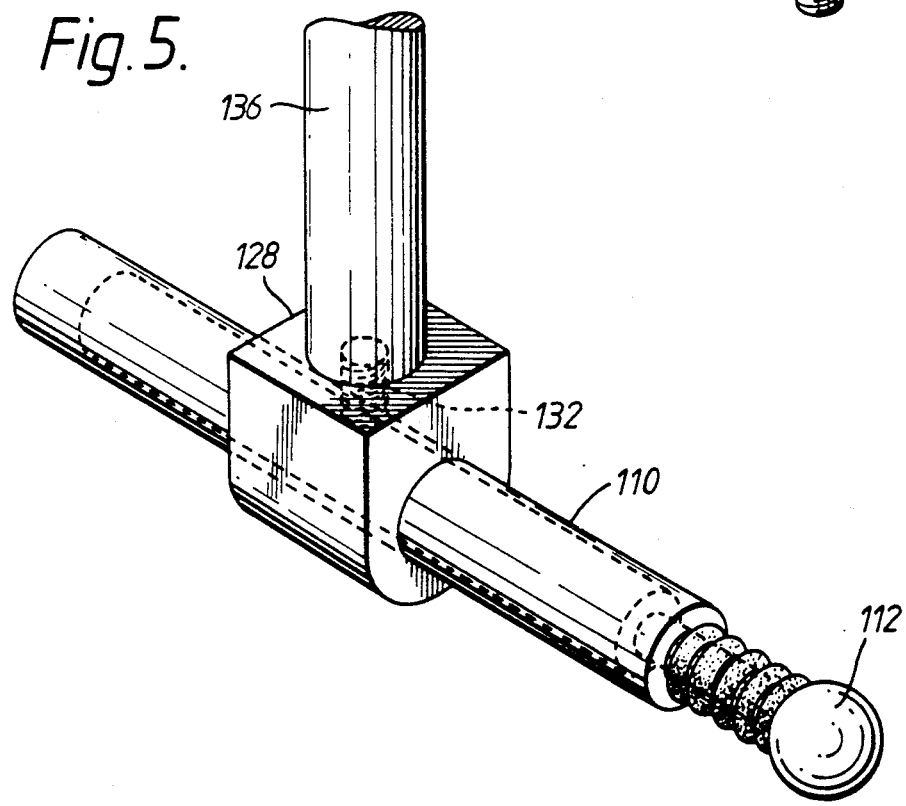
FIG. 5 is a perspective view of components shown in FIG. 4, but in a dial gauge configuration.

FIG. 5 shows a modified configuration, useful when the transducer unit 110 is to be used as an electronic dial gauge. In this configuration, an extension bar or rod 136 is mounted to the spindle of the machine tool, or clamped to the bed of the machine, or mounted in any other desired manner. The extension bar 136 has an M6 screw-threaded boss, similar to that of the socket 130. This is screwed into the screw threaded bore 132 of collar 128, and serves to fix the collar at a desired position along on the transducer unit 110. This configuration can be used in the same manner as the configuration of FIG. 3.

Figure 6:
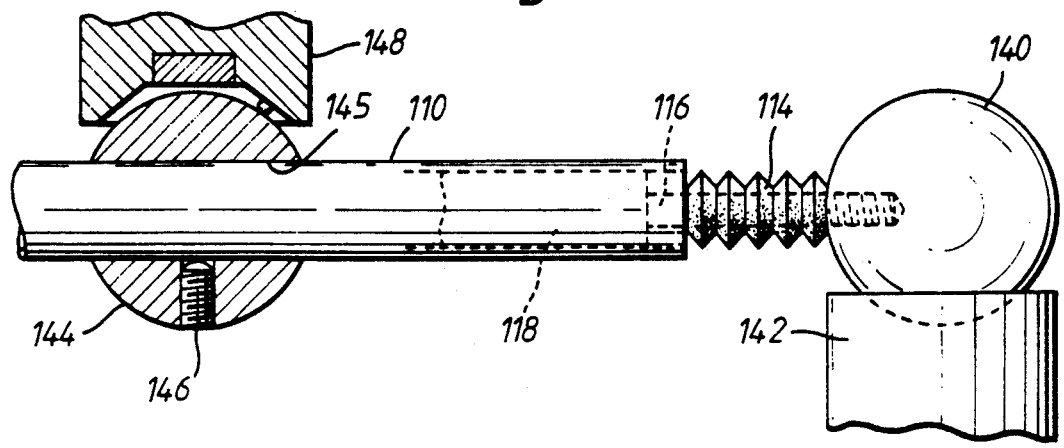
FIG. 6 is a partially sectional view of an embodiment modified from FIG. 4.

FIG. 6 shows a modification of the FIG. 4 arrangement, in which the collar 128 is replaced by a precision ball 144, having a central through bore 145 which slidably receives the transducer unit 110. A grub screw 146 secures the ball 144 at any desired position along the unit 110. The ball 112 is replaced by a larger precision ball 140, which is the same size at the ball 144 to ensure calibrations can be performed accurately. The balls 140,144 are pivotably mounted in respective precision magnetic sockets 142,148, which are larger than previously, to suit the size of the balls 140,144. The sockets are respectively mounted to the table and to the head or spindle of the machine tool, as previously. The arrangement of FIG. 6 is more geometrically correct than that of FIG. 4, since the ball 144 can be caused to circle in the same horizontal plane as the ball 140, whilst still keeping the transducer unit 110 horizontal.

Figure 7:
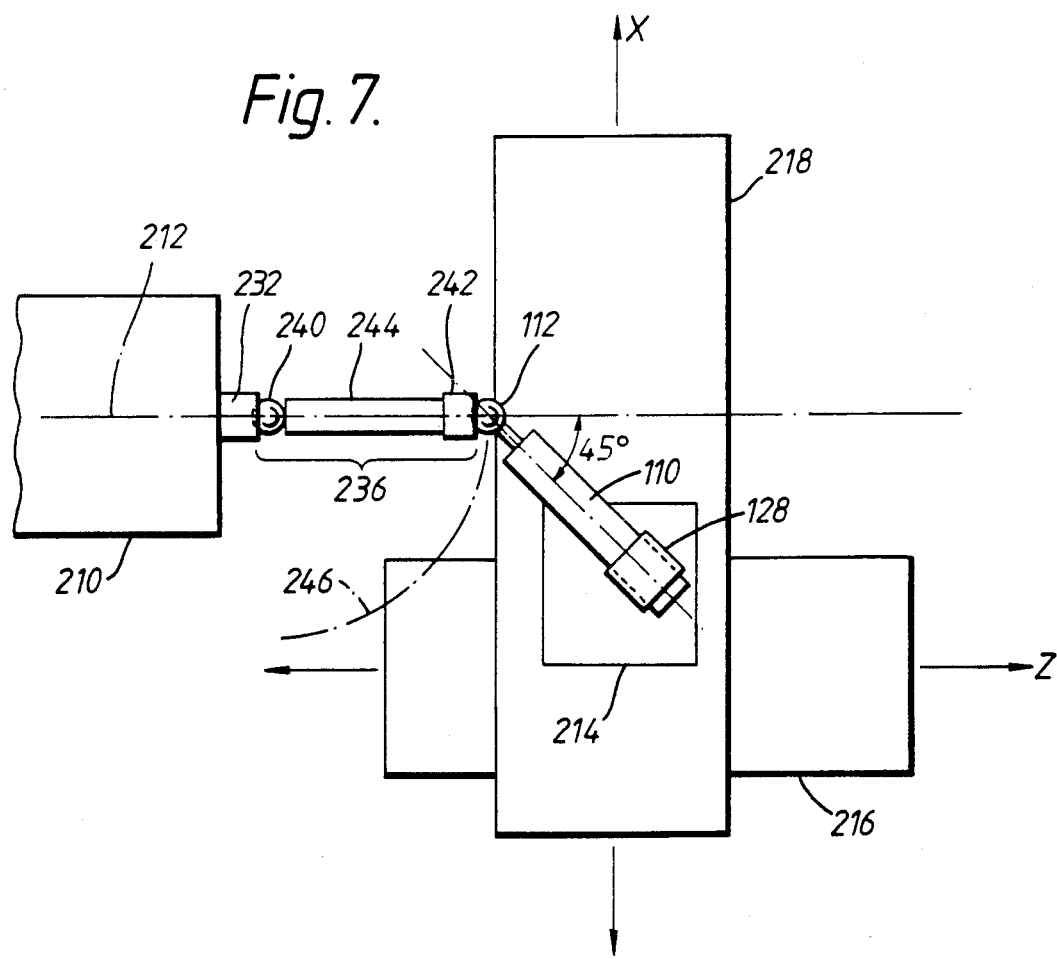
FIG. 7 is a diagrammatic plan view of a further configuration of components from FIGS. 1-5, mounted on a lathe.

Reference will now be made to FIG. 7. In order to calibrate the ability of a toolholder or tool post on a lathe to follow a circular path, British Standard 4656 Part 28 requires that a displacement transducer is mounted on the tool post of the lathe in place of a cutting tool. The lathe is then programmed to drive the tool post in a circular path around the centre of an artefact while the tip of the displacement transducer moves over the surface of this artefact. FIG. 7 illustrates a method of achieving a similar calibration.

In FIG. 7, a lathe comprises a spindle 210 rotatable about an axis 212 and a tool post 214 mounted for movement relative to the spindle in a direction parallel to the spindle axis 212 (the Z direction) on a carriage 216, and for movement in a direction perpendicular to the axis 212 (the X direction) on a cross-slide 218, itself mounted upon the carriage 216. The ball-bar unit 110 as shown in FIG. 4, with its telescopically mounted ball 112, is mounted on the tool post 214, e.g. by clamping it with the collar 128 described above. The unit 30 of FIG. 1 could be used instead.

The spindle 210 of the lathe supports a precision magnetic socket or cup 232, similar to those described previously. Between the cup 232 and the ball 112 of the ball-bar 110, a pivotal linkage 236 is provided. The linkage includes a ball 240, and a further socket or cup 242, which is identical to the cup 232. A rod 244 rigidly connects the ball 240 and the cup 242. The ball 240 of the linkage 236 is pivotably retained in the cup 232, and the ball 112 at the end of the ball-bar 110 is pivotably retained at the other end of the linkage 236 in the cup 242. The linkage 236 thus constitutes an artefact of fixed length which pivotally connects the ball 112 on the ball-bar 110 to the cup 232 provided in the spindle 212.

In order to calibrate the lathe, the tool post 214 is driven by the X and Z slides 216,218 in such as way as to move the ball 112 of the ball-bar 110 along the arcuate path indicated by the broken line 246. Due to the coupling between the cup 242 and the ball 112, the linkage 236 will pivot round together with the ball 112, while the centre to centre spacing between the balls 112 and 240 remains constant; any deviation in the movement of the tool post 214 from the path 246 is thus accommodated by the telescoping construction of the ball-bar 110. The magnitude of any such deviation in the direction of the ball-bar axis is measured by the transducer in the ball-bar 110 and is sent to a recording device such as a computer. From the data obtained in the recording device it is possible to determine the degree of accuracy with which the tool post 214 was driven along the path 246.

In order to minimise side loading at the two extremes of displacement along the path 246 the ball-bar 110 is preferably mounted in the tool post 214 such that its axis extends at 45° to the axis 212 of the lathe spindle 210.

The linkage is preferably constructed from the various modular components described above. The rod 244 may be formed by an extension bar 40 from FIG. 1, having a precision ball 240 screwed onto one end and the socket or cup 242 screwed onto the other. Alternatively, the socket or cup 232 may be provided on the rod 244 and the ball 240 may be fixed in the spindle 210. In another alternative, the ball 240 is received between the cup 232 on the spindle and a further cup on the rod 244; in this case one of the cups may be modified to receive the ball 240 fixedly instead of pivotably.

In a further alternative embodiment, a cup is provided in place of the ball 112 on the ball-bar 110, which then enables a standard fixed-length ball-bar test gauge device (having a ball at each end) to be used as the linkage 236.

We claim:

1. A calibration device for calibrating a coordinate positioning machine having two machine parts which are movable in two or three dimensions relative to each other, the device comprising: an elongate bar; a first reference element at one end of the bar and a second reference element at a location on the bar spaced from the first reference element, said first and second reference elements each being pivotably connectable to a respective one of said machine parts; telescopic means for permitting the first reference element to move in an axial direction of the bar relative to the second reference element; a transducer for measuring such movement; and a rigid support member which is releasably connectable to the bar, the rigid support member comprising means for securing the bar rigidly to the machine.

2. A device according to claim 1, wherein the second reference element is releasably connected to the elongate bar.

3. A device according to claim 2, wherein the rigid support member is releasably connectable to the elongate bar in place of the second reference element.

4. A device according to claim 2, including an extension bar which is releasably connectable between said elongate bar and said second reference element.

5. A device according to claim 1, wherein the first reference element is a ball.

6. A device according to claim 1, wherein the second reference element is a cup or socket for pivotably receiving a ball.

7. A device according to claim 1, wherein the second reference element is connectable to the elongate bar at a position intermediate the ends of the elongate bar.

8. A device according to claim 7, wherein the second reference element is connectable to the elongate bar at any of a plurality of positions intermediate the ends of the elongate bar.

9. A calibration device for calibrating a coordinate positioning machine having two machine parts which are movable in two or three dimensions relative to each other, the device comprising: an elongate bar having a first connector at one end thereof for universal pivotable connection of said one end to one of said machine parts, said first connector being axially movable relative to an opposing end of the bar; a transducer being provided in the bar for measuring said axial movement, said transducer having two ends; and a second connector being provided for universal pivotable connection between the bar and the other one of said machine parts, wherein said second connector is fixable at an intermediate position on the bar between the ends of the transducer.

10. A device according to claim 9, wherein the second connector is provided on an element which is fixable at any of a plurality of positions intermediate the ends of the elongate bar.

11. A device according to claim 9, wherein the second connector comprises a collar around the bar.

12. A device according to claim 11, wherein the collar has a spherical surface.

* * * * *